(12) United States Patent
Werner

(10) Patent No.: US 10,648,516 B2
(45) Date of Patent: May 12, 2020

(54) DOUBLE CLUTCH DEVICE

(71) Applicant: BorgWarner Inc., Auburn Hills, MI (US)

(72) Inventor: Matthias Werner, Mannheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/339,100

(22) PCT Filed: Sep. 28, 2017

(86) PCT No.: PCT/US2017/053861
§ 371 (c)(1),
(2) Date: Apr. 3, 2019

(87) PCT Pub. No.: WO2018/067366
PCT Pub. Date: Apr. 12, 2018

(65) Prior Publication Data
US 2019/0234467 A1    Aug. 1, 2019

(30) Foreign Application Priority Data
Oct. 4, 2016   (DE) ........................ 10 2016 011 904

(51) Int. Cl.
*F16D 25/10*   (2006.01)
*F16D 25/0638*   (2006.01)
(Continued)

(52) U.S. Cl.
CPC ............. *F16D 21/06* (2013.01); *F16D 13/52* (2013.01); *F16D 13/58* (2013.01); *F16D 25/082* (2013.01); *F16D 2021/0661* (2013.01)

(58) Field of Classification Search
CPC ................. F16D 2021/0661; F16D 2021/0676
See application file for complete search history.

(56) References Cited

U.S. PATENT DOCUMENTS 2,406,238 A * 8/1946 Miller .................... F16D 21/06
192/48.91
4,741,422 A * 5/1988 Fuehrer .................. F16D 25/12
192/106 F
(Continued)

FOREIGN PATENT DOCUMENTS

DE    102015225033 A1 *  6/2017 ............. F16D 21/06
KR      20100066373 A     6/2010
WO   WO-2016019958 A2 *  2/2016 ............. F16D 21/06

OTHER PUBLICATIONS

English language abstract for KR 2010-0066373 extracted from espacenet.com database on Apr. 24, 2019, 2 pages.
(Continued)

*Primary Examiner* — Charles A Fox
*Assistant Examiner* — Ryan P Dodd
(74) *Attorney, Agent, or Firm* — Howard & Howard Attorneys PLLC

(57) ABSTRACT

The present invention relates to a double clutch device (2) with a first clutch (18) for selective torque transmission between a clutch input side (26) and a first clutch output side (28) and a second clutch (20) for selective torque transmission between the clutch input side (26) and a second clutch output side (30), wherein an actuating force (78) counter to the reset force (102) of a first spring device (100) may be applied to the first clutch (18) via a first force transmission element (76) and an actuating force (82) counter to the reset force (116) of a second spring device (114) may be applied to second clutch (20) via a second force transmission element (80). The first spring device (100) extends through at least one recess (104) in the second force transmission element (80).

22 Claims, 3 Drawing Sheets

Figure 1:
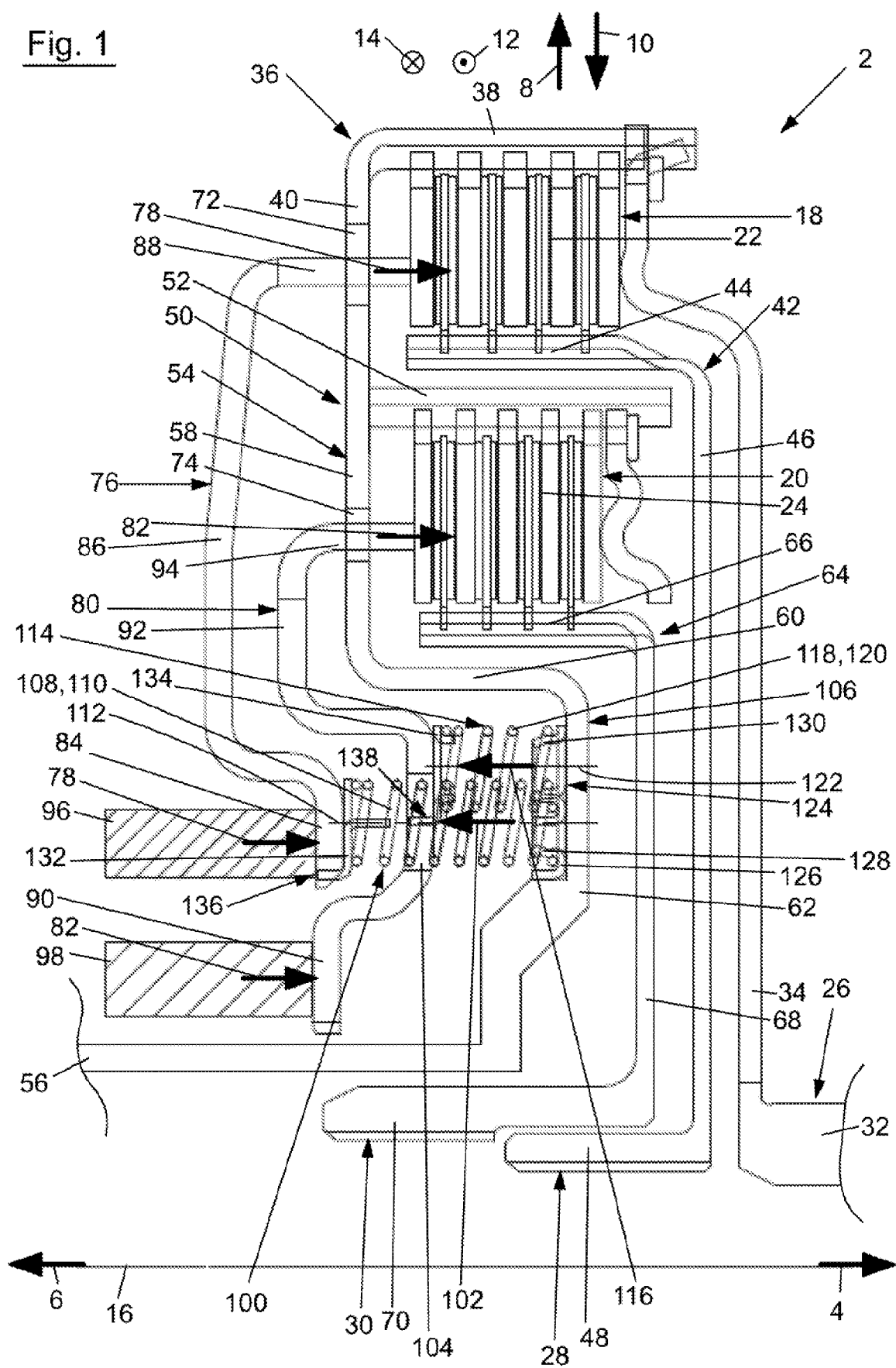

(51) Int. Cl.
*F16D 21/06* (2006.01)
*F16D 13/52* (2006.01)
*F16D 25/08* (2006.01)
*F16D 13/58* (2006.01)

(56) References Cited

U.S. PATENT DOCUMENTS

| | | | |
|---|---|---|---|
| 7,350,633 B2* | 4/2008 | Portell | F16D 25/0638 |
| | | | 188/71.5 |
| 8,813,929 B2* | 8/2014 | Kimes | F16D 41/125 |
| | | | 192/43.1 |
| 2002/0007997 A1 | 1/2002 | Kundermann et al. | |
| 2002/0060118 A1 | 5/2002 | Beneton et al. | |
| 2005/0103594 A1 | 5/2005 | Tiesler et al. | |
| 2007/0175725 A1* | 8/2007 | Sawayanagi | F16D 25/0638 |
| | | | 192/70.2 |
| 2007/0193848 A1 | 8/2007 | Uhler et al. | |
| 2008/0041688 A1 | 2/2008 | Bauer et al. | |
| 2010/0140036 A1 | 6/2010 | Ross | |
| 2011/0036677 A1* | 2/2011 | Kriebernegg | F16D 13/52 |
| | | | 192/70.12 |
| 2011/0192699 A1* | 8/2011 | Yazaki | F16D 13/52 |
| | | | 192/70.12 |

OTHER PUBLICATIONS

International Search Report for Application No. PCT/US2017/053861 dated Dec. 15, 2017, 4 pages.

\* cited by examiner

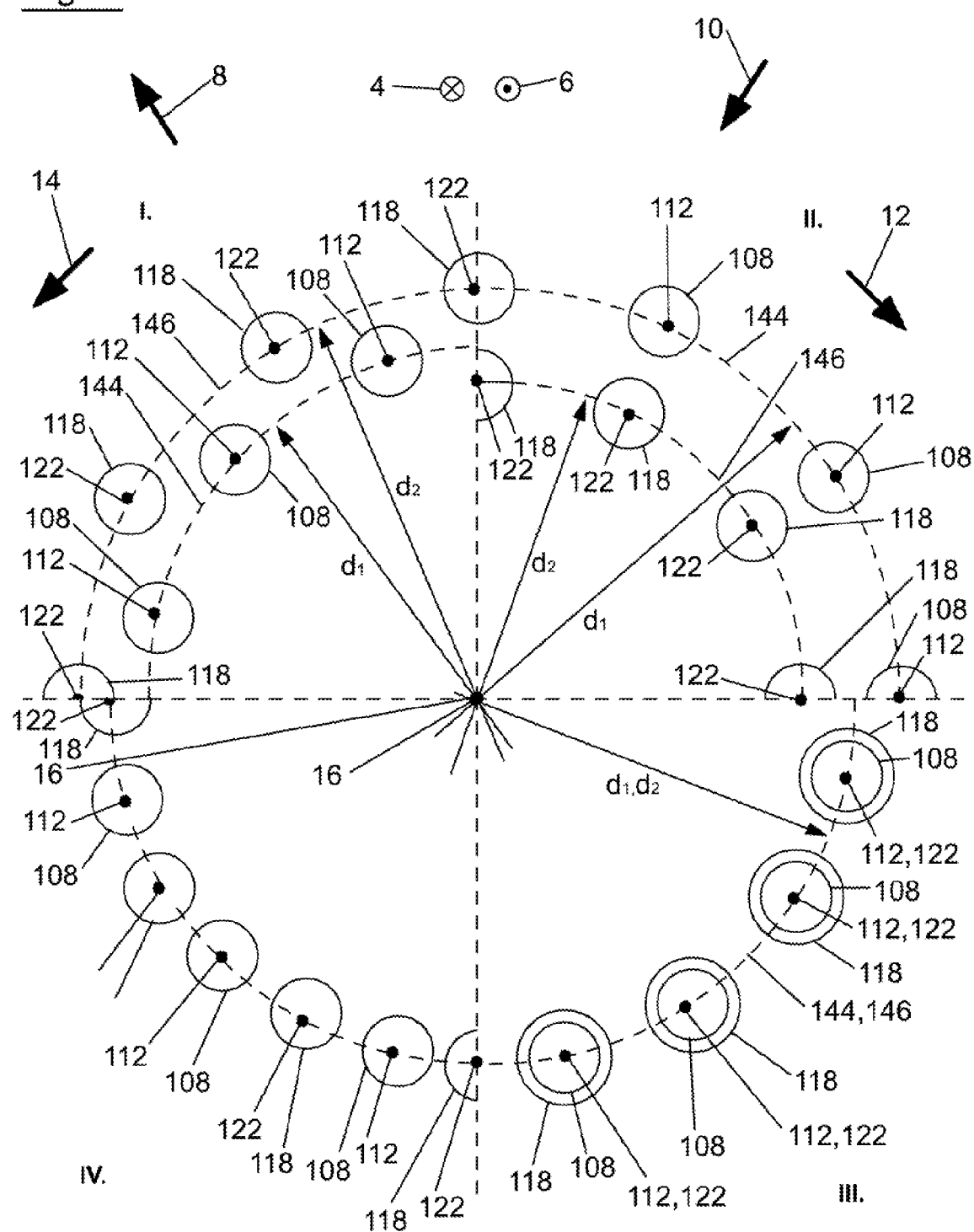

DOUBLE CLUTCH DEVICE

CROSS-REFERENCE TO RELATED APPLICATIONS

The present application is the National Stage of International Patent Application No. PCT/US2017/053861 filed on Sep. 28, 2017, which claims priority to and all the benefits of German Application No. 10 2016 011 904.7 filed on Oct. 4, 2016, which are hereby expressly incorporated herein by reference in their entirety.

The present invention relates to a double clutch device comprising a first clutch and a second clutch, wherein an actuating force counter to the reset force of a first spring device may be applied to the first clutch via a first force transmission element and an actuating force counter to the reset force of a second spring device may be applied to the second clutch via a second force transmission element.

Double clutch devices are known from practice that have a first clutch for selective torque transmission between a clutch input side and a first clutch output side, and a second clutch for selective torque transmission between the clutch input side and a second clutch output side. To be able to actuate the clutches, force transmission elements are assigned to the same, via which an actuating force may be applied to the respective clutch. Resetting the respective force transmission element or the associated clutch is hereby generally carried out via a spring device. Thus, in general, the actuating force counter to the reset force of a first spring device may be applied to the first clutch via a first force transmission element and the actuating force counter to the reset force of a second spring device may be applied to the second clutch via a second force transmission element.

The known double clutch devices have proven themselves; however, they are in need of improvement, as a particularly space-saving arrangement of the spring devices to achieve a compact structure of the double clutch is not provided.

The underlying object of the present invention is to refine a double clutch device of the generic type in such a way that this has a particularly compact structure.

This problem is solved by the features listed in Claim 1. Advantageous embodiments of the invention are the subject matter of the subclaims.

The double clutch device according to the invention, which may be, for example, a double disk clutch device, has a first clutch for selective torque transmission between a clutch input side and a first clutch output side, and a second clutch for selective torque transmission between the clutch input side and a second clutch output side. To actuate the first and second clutches, force transmission elements are assigned to said clutches, via which torque transmission elements an actuating force from an actuating device, for example, a hydraulic actuating device, may be transmitted to the respective clutch, optionally, the disk set thereof. Thus, an actuating force counter to the reset force of a first spring device is applicable to the first clutch via a first force transmission element. Correspondingly, an actuating force counter to the reset force of a second spring device is applicable to the second clutch via a second force transmission element. To achieve a relatively compact structure of the double clutch device, in particular in the area of the two spring devices, the first spring device extends through at least one recess in the second force transmission element. In this way, the two spring devices may be arranged relatively close to one another, among other things, in order to achieve a compact structure of the double clutch device in this area.

In order to achieve a compact structure with respect to the radial installation space of the double clutch device, the first spring device in one preferred embodiment of the double clutch device according to the invention is arranged farther inward in the radial direction that the first and/or second clutch, wherein it is hereby preferred if the first spring device is arranged in the radial direction completely inward of the first and/or second clutch. To also reduce the installation space requirements in this embodiment in the axial direction, it is additionally preferred if the first spring device is arranged nested with the first and/or second clutch in the radial direction, consequently, an axial overlapping area is created.

In another preferred embodiment of the double clutch device according to the invention, the second spring device is arranged farther inward in the radial direction, optionally, completely inward of the first and/or the second clutch in order to reduce the installation space requirements in the radial direction, wherein it is also preferred in this embodiment if the second spring device is arranged nested with the first and/or second clutch in the radial direction to also reduce the spatial installation requirements in the axial direction.

In one advantageous embodiment of the double clutch device according to the invention, the first spring device has at least one spring element that extends through the recess in the second force transmission element. This may be any spring element that has a flexible, consequently, elastic property. Thus, for example, a so-called disk spring or also a corrugated annular spring might come into consideration; however, it is preferred in this embodiment if the at least one spring element is formed by a helical spring, optionally, a helical compression spring. It is additionally preferred in this embodiment, if multiple recesses are provided in the second force transmission element through which at least one spring element respectively extends in order to achieve a uniform application of the reset force on the first force transmission element during actuation of the same.

In another advantageous embodiment of the double clutch device according to the invention, the second spring device has at least one spring element, consequently a flexible or elastic element which is suitable for achieving the reset force acting on the second force transmission element. It is hereby preferred, if the at least one spring element is formed by a helical spring, optionally, a helical compression spring; although a spring element in the form of a disk spring or a corrugated annular spring would also come into consideration here. In this embodiment, it is additionally preferred if the second spring element for applying the reset force to the second force transmission element has multiple spring elements.

To apply the reset force particularly uniformly to the first force transmission element, the spring axes of the spring elements, thus, for example, the helical springs, of the first spring device, are arranged on a common first circumferential circle. Alternatively or supplementally, the spring axes of the spring elements, thus, for example, the helical springs, of the second spring device, are arranged on a common second circumferential circle to achieve a uniform application of the reset force to the second force transmission element.

In another preferred embodiment of the double clutch device according to the invention, the first circumferential circle and the second circumferential circle have diameters that deviate from one another in order to achieve a relatively dense arrangement of spring elements of the two spring devices in a relatively small installation space. Thus, the spring axes may be arranged, for example, in such a way that a radial line of the double clutch device extends both through the spring axis of a spring element of the first spring device and also through the spring axis of a spring element of the second spring device, and said two spring elements are thus analogously arranged aligned one behind the other in the radial direction. However, to achieve a particularly compact structure in the area of the two spring devices, the spring axes of the spring elements of the first spring device and the spring axes of the spring elements of the second spring device are preferably offset to one another in the circumferential direction, given that a particularly dense arrangement of the spring elements in a small structure is thus possible, even if the first and second circumferential circles have only small deviations in diameter. In this context, it is additionally particularly preferred in this embodiment if the circumferential circles, thus the first and second circumferential circles, and the spring elements, thus the spring elements of the first and second spring devices, are dimensioned in such a way that the spring elements of the first and second spring devices are arranged overlapping one another, when viewed in the circumferential direction, in order to achieve a particularly compact and dense structure of the double clutch device in the area of the two spring devices.

Alternatively to the previously described embodiment, the first and second circumferential circles have the same diameter in another advantageous embodiment of the double clutch device according to the invention, in order to achieve a particularly compact structure of the double clutch device in the area of the two spring devices in the radial direction.

In another advantageous embodiment of the double clutch device according to the invention, in which the first and second circumferential circles have the same diameter, the spring elements, thus, for example, the helical springs, of the first spring device extend through the spring elements, thus, for example, the helical springs, of the second spring device in order to achieve a most compact structure of the double clutch device and a high spring density in the smallest installation space. In the case that helical springs are used, a helical spring from the first spring device might consequently extend through the spring interior surrounded by the spring coils of the helical spring of the second spring device. In this embodiment, it is additionally preferred if the spring elements of the first spring device extend coaxially to the spring elements of the second spring device. Analogously, in this embodiment, the spring axes of the spring element of the first spring device and of the spring element of the second spring device, through which the first spring element extends, coincide.

Alternatively to the previously described embodiment, in which the first and second circumferential circles have the same diameter, in another advantageous embodiment of the double clutch device according to the invention, the spring elements of the first spring device are arranged offset in the circumferential direction to the spring elements of the second spring device. It is hereby particularly preferred, if a spring element of the first spring device always follows a spring element of the second spring device, and vice versa.

Basically, the recess in the second force transmission element might be designed as a notch in the edge of the second force transmission element. Such a notch in the edge would have, however, a negative effect on the strength of the second force transmission element, consequently also on its ability to transmit an actuating force in order to apply the same to the second clutch. To prevent this, the at least one recess in the second force transmission element is designed like a window, consequently completely enclosed on the edges.

In another advantageous embodiment of the double clutch device according to the invention, multiple recesses, optionally window-like recesses, distributed in the circumferential direction, are provided in the second force transmission element, through which recesses the first spring device, optionally its spring elements, may extend. By thus means, a uniform application of the reset force of the first spring device on the first force transmission element is ensured, wherein it is preferred if the recesses are uniformly distributed in the circumferential direction and/or are spaced apart from one another.

In another preferred embodiment of the double clutch device according to the invention, the first spring device is supported or supported on the one side on the first force transmission element and on the other side on a clutch component. The clutch component is preferably a component fixed on a coupling hub in at least one axial direction. In the case of a double clutch device with disk clutches, the clutch component is preferably formed from a disk carrier.

In one particularly preferred embodiment of the double clutch device according to the invention, which is based on the previously described embodiment, the second spring device is supported or supported on the one side on the second force transmission element and on the other side on the same clutch component, thus on that same clutch component on which the first spring device is supported or supportable.

To achieve a secure support of the two spring devices on the clutch component, and thereby to likewise achieve a simple structure and a simple assembly of the double clutch device, the first and second spring devices are supportable or supported via a common support part on the clutch component in one particularly preferred embodiment of the double clutch device according to the invention. Basically, the common support part might thereby be designed as two-part or multi-part, yet continuous; however, it is preferred in this embodiment if the common support part is designed as a one-piece support part to simplify assembly and production.

In another advantageous embodiment of the double clutch device according to the invention, the support parts has first retaining sections on which the spring elements of the first spring device are retained or fixed, and second retaining sections on which the spring elements of the second spring device are retained or fixed. Thus, it is particularly preferred with regard to said retaining sections if they retain or support the spring elements transverse to the spring axes. A fixing in the direction of the spring axis, for example, a corresponding positive locking fixing, is not absolutely necessary; however, within the context of the assembly of the spring devices within the double clutch device, this may be preferred.

In another advantageous embodiment of the double clutch device according to the invention, the first and second retaining sections are designed as projecting extensions on the common support part, wherein these may preferably be tubular extensions in order to create a light-weight support part and still guarantee a secure retaining or fixing of the spring elements.

In another preferred embodiment of the double clutch device according to the invention, the first retaining sections designed as projecting extensions are designed in such a way that they extend into the spring elements of the two spring devices designed as helical springs.

In another advantageous embodiment of the double clutch device according to the invention, the common support part for the two spring devices is designed as annular shaped or annular disk shaped.

In order to create a support part for the two spring devices that is easy to manufacture and lightweight, the support part is designed as a sheet metal part or as a shaped sheet metal part in another preferred embodiment of the double clutch device according to the invention. In this embodiment, it is additionally preferred if the retaining sections, thus, in particular the projecting extensions or the projecting tubular extensions, are formed integrally with the sheet metal part or shaped sheet metal part forming the support part. Thus, the projecting extensions or also the projecting tubular extensions might be manufactured relatively easily, in particular by deep drawing the sheet metal part or shaped sheet metal part.

In another preferred embodiment of the double clutch device according to the invention, the double clutch device is designed as a concentric double clutch device, wherein the first clutch is designed as the outer clutch and the second clutch is designed as the inner clutch. It is hereby particularly preferred if the first clutch designed as the outer clutch surrounds the second clutch designed as the inner clutch radially outwardly, or a nesting is provided in the radial direction in order to achieve a low axial installation length of the double clutch device.

In another advantageous embodiment of the double clutch device according to the invention, the first clutch and the second clutch are designed as disk clutches. It is hereby preferred, if the previously mentioned clutch component, on which the first and optionally also the second spring device are supported or supportable, is a disk carrier for one or both clutches designed as disk clutches. It is hereby additionally particularly preferred, if the clutch component is a radial section of a disk carrier for one or both disk clutches, or is a common radial section of the disk carrier for both disk clutches.

In another advantageous embodiment of the double clutch device according to the invention, the first force transmission element has actuating fingers which extend through windows in a disk carrier to a disk set of the first clutch in order to be able to apply the actuating force on the disk set of the first clutch. Alternatively or supplementally, the second force transmission element has actuating fingers which extend through windows in a disk carrier to a disk set of the second clutch in order to be able to apply the actuating force on the disk set of the second clutch.

Figure 2:
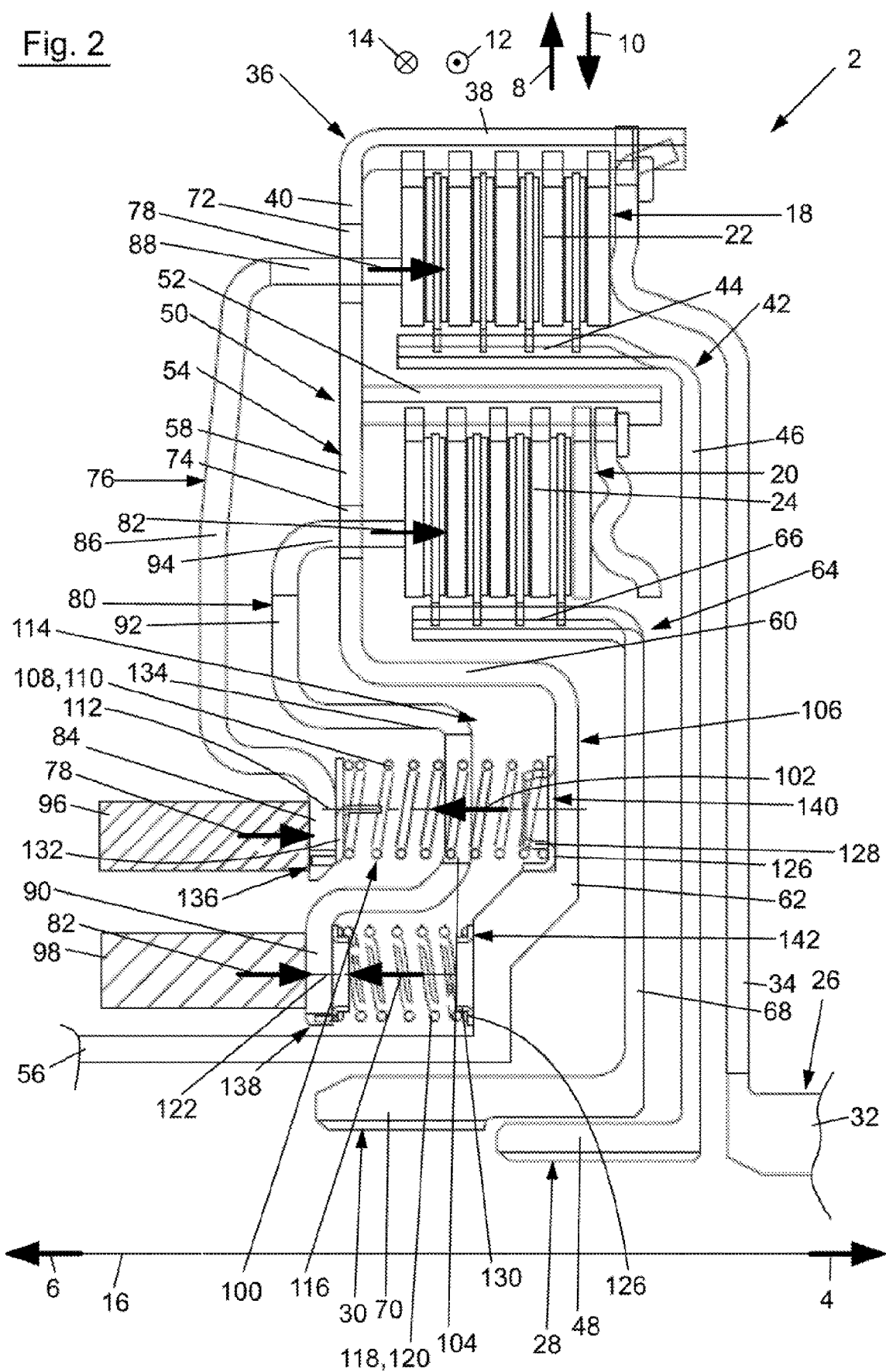

The invention will subsequently be explained in more detail by means of exemplary embodiments with reference to the accompanying drawings. As shown in:

FIG. 1 a partial side view of a first embodiment of a double clutch device in a cutaway view, FIG. 2 a partial side view of a second embodiment of a double clutch device in a cutaway view, and FIG. 3 a front view of the spring device from FIGS. 1 and 2 in schematic depiction to illustrate the different potential arrangements of the spring elements of the spring devices.

FIG. 1 shows a first embodiment of a double clutch device 2. In the figures, opposite axial directions 4, 6, opposite radial directions 8, 10, and opposite circumferential directions 12, 14 are indicated by means of corresponding arrows, wherein double clutch device 2 has an axis of rotation 16 which extends in axial directions 4, 6.

Double clutch device 2 is designed as a concentric double clutch device 2, in which a first clutch 18 surrounds a second clutch 20 outwardly in radial direction 8 so that first clutch 18 may also be designated as an outer clutch and second clutch 20 may also be designated as an inner clutch. In the embodiment depicted, first clutch 18 is additionally arranged in radial direction 8, 10 as nested with second clutch 20. Both first clutch 18 and also second clutch 20 are designed as disk clutches which respectively have a disk set 22 or 24 made from outer disks and inner disks that alternate with one another in axial direction 4, 6.

While first clutch 18 functions for selective torque transmission between a clutch input side 26 and a first clutch output side 28, second clutch 20 functions for selective torque transmission between clutch input side 26 and a second clutch output side 30.

Double clutch device 2 has a clutch input hub 32 which may be directly or indirectly connected rotationally fixed to the output side of a drive unit, for example, in the form of an internal combustion engine, not shown in more detail. Clutch input hub 32 is connected rotationally fixed to a rotary driving disk 34, which starts from clutch input hub 32 and extends outward in radial direction 8. Outward in radial direction 8, rotary driving disk 34 is in rotary driving connection with a first outer disk carrier 36 assigned to first clutch 18. First outer disk carrier 36 is essentially composed of a tubular disk support section 38 and a radial section 40, which connects in axial direction 6 and extends inward in radial direction 10 starting from disk support section 38. Rotary driving disk 34 thereby engages in the rotary driving contour of disk support section 38 to achieve a rotary driving connection, wherein, in addition, the outer disks of disk set 22 of first clutch 18 are in rotary driving connection with disk support section 38; however, they are arranged thereon to be displaceable in axial directions 4, 6. In addition, a first inner disk carrier 42 is assigned to first clutch 18 and has an essentially tubular disk support section 44 with a rotary driving contour and a radial section 46, which is connected to disk support section 44 in axial direction 4 and extends inward in radial direction 10 from disk support section 44 up to a first clutch output hub 48, which forms the previously mentioned first clutch output side 28 and is connected rotatably fixed to a first transmission input shaft, not depicted in greater detail. Disk support section 44 of first inner disk carrier 42 is in turn in rotary driving connection with the inner disks of disk set 22 of first clutch 18, wherein the inner disks are also displaceable in axial directions 4, 6 relative to disk support section 44.

Rotary driving disk 34 is additionally connected rotationally fixed to a second outer disk carrier 50 assigned to second clutch 20 via disk support section 38 and radial section 40 of first outer disk carrier 36. Second outer disk carrier 50 is also composed of an essentially tubular disk support section 52 with a rotary driving contour and a radial section 54 extending essentially inward in radial direction 10 and connected in axial direction 6 to disk support section 52, wherein radial section 54 extends inward in radial direction 10 up to clutch hub 56, which forms first clutch output hub 28. It is also thereby clear in FIG. 1 that radial section 54 functions not only to support second clutch 20 in radial directions 8, 10 on clutch hub 56, but also to support first outer disk carrier 36 in radial directions 8, 10 on clutch hub 56 so that radial section 54 may also be designated as common radial section 54 of the two outer disk carriers 36, 50 or as common support part for supporting the two outer disk carriers 36, 50 on clutch hub 56. It is also clear in FIG. 1 that radial section 54 has a stepped progression. Thus, radial section 54 has a first partial section 58 extending in radial direction 10, a second partial section 60 extending inward in radial direction 10 to connect to first partial section 58 and extending in axial direction 4, and a third partial section 62 extending in axial direction 4 to connect to second partial section 60 and extending inward in radial direction 10 up to clutch hub 56. While disk support section 52 is in rotary driving connection with the outer disks of disk set 24 of second clutch 20, the inner disks of said disk set 24 are in rotary driving connection with second inner disk carrier 64 assigned to second clutch 20. More precisely stated: second inner disk carrier 64 has an essentially tubular disk support section 66 with a rotary driving contour, with which the inner disks of disk set 24 are in rotary driving connection and displaceable in axial directions 4, 6, and a radial section 68 connecting in axial direction 4 to disk support section 66; said radial section 68 starts from disk support section 66 and extends inward in radial direction 10 up to a second clutch output hub 70, which forms the previously mentioned second clutch output side 30 and which may be connected rotationally fixed to a second transmission input shaft, not shown in greater detail.

Within the drivetrain, the first transmission input shaft assigned to first clutch output hub 48 preferably extends through the essentially tubularly designed second transmission input shaft, which is assigned to second clutch output hub 70, wherein the two transmission input shafts are thereby preferably arranged coaxial to one another. Previously mentioned clutch hub 56 is preferably supported in radial directions 8, 10 via at least one radial bearing, not shown in greater detail, wherein this support in radial directions 8, 10 may be carried out, for example, on the outer side of the second transmission input shaft and/or a housing, for example, a transmission housing.

Multiple windows 72 or 74, which function to guide the force transmission elements, subsequently described in greater detail, for clutches 18, 20, are provided distributed in circumferential directions 12, 14 and spaced apart from one another, both in radial section 40 of first outer disk carrier 36 and also in radial section 54, more precisely first partial section 58, of second outer disk carrier 50.

An actuating force 78 may be applied to disk set 22 of first clutch 18 via a first force transmission element 76, while an actuating force 82 may be applied to disk set 24 of second coupling 20 via a second force transmission element 80. The two force transmission elements 76, 80 are thereby arranged in axial direction 6 next to radial sections 40 and 54 of the two outer disk carriers 36, 50, wherein second force transmission element 80 initially follows radial sections 40, 54 in axial direction 6, while first force transmission element 76 follows second force transmission element 80 in axial direction 6. The two force transmission elements 76, 80 are thereby designed essentially with an annular disk shape or with a plate shape.

First force transmission element 76 has an application section 84 on which actuating force 78 may be applied, wherein a transmission section 86 connects to application section 84 outward in radial direction 8. Actuating fingers 88 are provided outwardly in radial direction 8 on transmission section 86, arranged spaced apart from one another in circumferential directions 12, 14 on transmission section 86 and extend, starting from transmission section 86 in axial direction 4 through windows 72 in first outer disk carrier 36 to disk set 22 of first clutch 18 in order to apply actuating force 78 to the same.

Correspondingly, second force transmission element 80 has an application section 90 to which actuating force 82 may be applied, a transmission section 92 connecting thereto in radial direction 8, and actuating fingers 94 arranged on transmission section 92 and spaced apart from one another in circumferential directions 12, 14, said actuating fingers extend in axial direction 4 through windows 74 in second outer disk carrier 50 in order to be able to apply actuating force 82 to disk set 24 of second clutch 20.

An actuating device 96, 98, indicated merely schematically, is respectively assigned to actuating sections 84, 90 of the two force transmission elements 76, 80 and may apply the respective actuating force 78, 82 on actuating section 84, 90 in axial direction 4. Actuating devices 96, 98 may, for example, be hydraulic actuating devices 96, 98. It is hereby preferred, if actuating devices 96, 98 have an actuating member, not depicted in greater detail, pressible or displaceable in axial direction 4; however, it is particularly preferred that the actuating member is rotary driving decoupled from respective actuating section 84, 90. This may be carried out, for example, by a disengagement bearing. Said actuating member is additionally preferably a hydraulically drivable piston, optionally, a ring piston.

Furthermore, a first spring device 100 is assigned to first force transmission element 76 and is arranged in such a way that actuating force 78 counter to a reset force 102 of first spring device 100 may be applied to first clutch 18 via first force transmission element 76. First spring device 100 thereby extends through at least one window-like recess 104 in second force transmission element 80. Stated more precisely, first spring device 100 is supported or supportable in axial direction 6 on first force transmission element 76, in this case on actuating section 84, and in axial direction 4 on clutch component 106, wherein clutch component 106 is formed in the embodiment depicted by second outer disk carrier 50, stated more precisely, by radial section 54 of second outer disk carrier 50, stated even more precisely, by third partial section 62 of said radial section 54. First spring device 100 extends in axial directions 4, 6 between the support points and through recess 104 in axial directions 4, 6.

Even if only one window-like recess 104 is depicted in FIG. 1, there are still multiple window-like recesses 104 provided in second force transmission element 80 distributed in circumferential directions 12, and spaced apart from one another in second force transmission element 80, and through which first spring device 100 extends. In the embodiment depicted, first spring device 100 has multiple spring elements 108, which are designed as helical springs 110, and have a spring axis 112 extending essentially in axial directions 4, 6. Spring elements 108 are thereby distributed in circumferential directions 12, 14 and arranged spaced apart from one another so that individual spring elements 108 each extend in axial directions 4, 6 through one of the previously mentioned recesses 104 in second force transmission element 80.

It is further clear from FIG. 1, that first spring device 100 made from spring elements 108 is arranged further inward in radial direction 10, stated more precisely, is arranged completely inward from first clutch 18 or disk set 22 and second clutch 20 or disk set 24, wherein first spring device 100 is arranged nested both with first clutch 18 and also with second clutch 20 in radial directions 8, 10, so that these have at least one axial overlapping area with said clutches 18, 20.

A second spring device 114 is assigned to second force transmission element 80 so that actuating force 82 counter to a reset force 116 of second spring device 114 may be applied to second clutch 20 or its disk set 24 via second force transmission element 80. Second spring device 114 also has at least one spring element 118, wherein, in the embodiment depicted, multiple spring elements 118 are provided, distributed in circumferential directions 12, 14 and spaced apart from one another, that are likewise designed as helical springs 120. Spring elements 118 thereby likewise have spring axes 122 extending essentially in axial directions 4, 6. Second spring device 114 is supported or supportable in axial direction 6 on second force transmission element 80 and in opposite axial direction 4 on the same clutch component 106 on which first spring device 100 is already supported or supportable in axial direction 4, in the present example, thus on radial section 54 of second outer disk carrier 50 or on third partial section 62 of said radial section 54. In addition, second spring device 114 is also arranged in radial direction 10 completely further inward from first clutch 18 or its disk set 22 and second clutch 20 or its disk set 24, wherein second spring device 114 is also arranged nested with first and second clutches 18, 20 in radial directions 8, 10 so that an axial overlapping area is present between second spring device 114 and the two clutches 18, 20.

In the embodiment according to FIG. 1, first and second spring devices 100, 114 or their spring elements 108, 118 are not directly supported or supportable on clutch component 106, but instead supported or supportable in axial direction 4 via a common support part 124. Support part 124 is thereby essentially annular shaped or annular disk shaped and designed as a sheet metal part or shaped sheet metal part, wherein annular or annular disk shaped common support part 124 extends in circumferential directions 12, 14. Common support part 124 may thereby be fastened or fixed in axial directions 4, 6 on clutch component 106; however, a detachable support in axial direction 4 on clutch component 106 is likewise possible. In the latter case, it is, however, preferred if a rotary driving connection, optionally a positive-locking rotary driving connection, is provided between common support part 124 and clutch component 106.

Common support part 124 has an annular disk shaped base section 126 which is supported or supportable in axial direction 4 on clutch component 106. In addition, retaining sections 128, 130 are arranged on base section 126 and are designed integrally with the sheet metal or shaped sheet metal part forming common support part 124. Thus, support part 124 has first retaining sections 128, on which spring elements 108 of first spring device 100 are retained or fixed. Thus, first retaining sections 128 cause, in particular, that spring elements 108 of first spring device 100 are supported or supportable transverse to their spring axes 112 on support part 124. In addition, first spring elements 108 may also be fastened or fixed in axial directions 4 and 6 on support part 124 via first retaining sections 128, wherein a positive locking fixing is preferred in this case. As is clear in FIG. 1, first retaining sections 128 are designed as extensions—in this case tubular extensions—which extend into spring elements 108 designed as helical springs 110 in order to support them transverse to spring axis 112. Thus, the projecting tubular extensions of first retaining sections 128 may be created, for example, by deep drawing the sheet metal or shaped sheet metal part, wherein it is preferred if common support part 124 has a through opening in axial directions 4, 6 in the interior of the projecting tubular extensions in order to reduce the weight of common support part 124. Corresponding second retaining sections 130, on which spring elements 118 of second spring device 114 are retained or fixed, are provided on common support part 124 for spring elements 118 of second spring device 114. Second retaining sections 130 are also designed as projecting tubular extensions that extend into spring elements 118 of second spring device 114 designed as helical springs 120.

Spring elements 108, 118 of spring devices 100, 114 are also not directly supported in opposite axial direction 6 on respective force transmission element 76, 80; instead, a support part 132, 134 is respectively provided in this case. Retaining sections for spring elements 108, 118 are also provided on support parts 132, 134, wherein it is preferred if support parts 132, 134 are also formed from a sheet metal or shaped sheet metal part. Support parts 132, 134 are also designed essentially as annular or annular disk shaped, while the retaining sections are formed from projecting extensions. Furthermore, a positive locking rotary driving connection 136 is present between support part 132 and first force transmission element 76. This applies correspondingly for support part 134 and second force transmission element 80, between which a positively locking rotary driving connection 138 is provided. In the embodiment depicted according to FIG. 1, it is additionally preferred if spring elements 108, 118 are fixed, preferably in a positive locking way, on common support part 124 in axial directions 4, 6, while the two support parts 132, 134 are merely loosely supported or supportable on spring elements 108, 118 in axial direction 4. Alternatively, to simplify the assembly, at least one of the two support parts 132, 134, preferably support part 134, might likewise be fixed in axial directions 4, 6 on respective spring element 108, 118. This might basically also apply for the two support parts 132, 134. The relevant fixing in axial directions 4, 6 is hereby carried out preferably by crimping or rolling up the respective retaining section designed as a projecting tubular extension.

Before addressing possible arrangements of spring elements 108, 118 of the two spring devices 100, 114 in greater detail with reference to FIG. 3, a second embodiment will be subsequently described with reference to FIG. 2, which embodiment essentially corresponds to the embodiment according to FIG. 1, so that subsequently only the differences are described; identical reference numerals are used for identical or similar parts, and otherwise the previous description correspondingly applies, wherein the different spring arrangements described later with reference to FIG. 3 are also eligible for the embodiment according to FIG. 2.

The essential difference between the embodiment according to FIG. 2 and the embodiment according to FIG. 1 consists in that there is no common or one-piece support part 124 in the second embodiment; instead, support parts 140, 142 are used which are designed separately from one another. Thus, spring elements 108 of first spring device 100 are supported on clutch component 106 via support part 140, while spring elements 118 of second spring device 114 are supported on clutch component 106 via support part 142. Otherwise, support parts 140 and 142 also have previously described first retaining sections 128 on the one side and previously described second retaining sections 130 on the other side.

FIG. 3 shows potential arrangements of spring axes 112, 122 or of spring elements 108, 118 for the embodiments according to FIGS. 1 and 2, wherein a first arrangement I is shown in the upper left in FIG. 3, a second arrangement II in the upper right in FIG. 3, a third arrangement III in the lower right in FIG. 3, and a fourth arrangement IV in the lower left in FIG. 3.

In the arrangements depicted in FIG. 3, which, unlike FIG. 3, consequently extend across the entire circumference, spring axes 112 of spring elements 108 of first spring device 100 are arranged on a common first circumferential circle 144, while spring axes 122 of spring elements 118 are arranged on a common second circumferential circle 146. In arrangements I and II, first circumferential circle 144 and second circumferential circle 146 have diameters $d_1$, $d_2$ deviating from one another. In arrangement I, spring axes 112 of spring elements 108 of first spring device 100 and spring axes 122 of spring elements 118 of second spring device 114 are offset from one another in circumferential directions 12, 14. It is thereby preferred if circumferential circles 144, 146 and spring elements 108, 118 are dimensioned in such a way that spring elements 108 of first spring device 100 and spring elements 118 of second spring device 114 are arranged overlapping one another when viewed in circumferential directions 12, 14, in order to be able to arrange spring elements 108, 118 jointly in a smallest installation space. Deviating from arrangement I, the dimensioning of circumferential circles 144, 146 and of spring elements 108, 118 may, however, be selected in such a way that no such overlapping occurs.

In arrangement II of FIG. 3, spring axes 112 of spring elements 108 of first spring device 100 are not offset to spring axes 122 of spring elements 118 of second spring device 114 in circumferential directions 12, 14; instead, spring axes 112 of spring elements 108 and spring axes 122 of spring elements 118 each lie on common radial lines through axis of rotation 16.

In arrangements III and IV according to FIG. 3, first and second circumferential circles 144, 146 have the same diameter, i.e., $d_1=d_2$. In this case, spring elements 108 of first spring device 100 may extend through spring elements 118 of second spring device 114, wherein spring axes 112, 122 are thereby preferably coincident so that the two spring elements 108, 118 extend coaxial to one another (arrangement III). Such an arrangement is then constructed particularly easily if spring elements 108, 118 are designed as helical springs 110, 120, as this has been previously described; particularly as helical springs 110 in this case may easily extend in axial directions 4, 6 through the spring interior space of helical springs 120. It should, however, be hereby considered that recesses 104 must be provided not only in second force transmission element 80, but also in previously described support part 134, through which spring element 108 of first spring device 100 must additionally extend. Alternative to arrangement III, spring elements 108 of first spring device 100 may, in the case of coincident diameters $d_1$, $d_2$ of circumferential circles 144, 146, also be arranged offset to spring elements 118 of second spring device 114 in circumferential directions 12, 14, as this is shown in arrangement IV, even if the number of spring elements 108, 118 is reduced by this means, in contrast to arrangement III, with the same installation dimensions.

LIST OF REFERENCE NUMERALS

2 Double clutch device
4 Axial direction
6 Axial direction
8 Radial direction
10 Radial direction
12 Circumferential direction
14 Circumferential direction
16 Axis of rotation
18 First clutch
20 Second clutch
22 Disk set
24 Disk set
26 Clutch input side
28 First clutch output side
30 Second clutch output side
32 Clutch input hub
34 Rotary driving disk
36 First outer disk carrier
38 Disk support section
40 Radial section
42 First inner disk carrier
44 Disk support section
46 Radial section
48 First clutch output hub
50 Second outer disk carrier
52 Disk support section
54 Radial section
56 Clutch hub
58 First partial section
60 Second partial section
62 Third partial section
64 Second inner disk carrier
66 Disk support section
68 Radial section
70 Second clutch output hub
72 Window
74 Window
76 First force transmission element
78 Actuating force
80 Second force transmission element
82 Actuating force
84 Application section
86 Transmission section
88 Actuating finger
90 Application section
92 Transmission section
94 Actuating finger
96 Actuating device
98 Actuating device
100 First spring device
102 Reset force
104 Recess
106 Clutch component
108 Spring element
110 Helical springs
112 Spring axis
114 Second spring device
116 Reset force
118 Spring element
120 Helical springs
122 Spring axis
124 Common support part
126 Base section
128 First retaining section
130 Second retaining section
132 Support part
134 Support part
136 Positive locking rotary driving connection
138 Positive locking rotary driving connection
140 Support part
142 Support part
144 First circumferential circle
146 Second circumferential circle
$d_1$ Diameter
$d_2$ Diameter

The invention claimed is:

1. A double clutch device (2) with a first clutch (18) for selective torque transmission between a clutch input side (26) and a first clutch output side (28), and a second clutch (20) for selective torque transmission between the clutch input side (26) and a second clutch output side (30), wherein an actuating force (78) counter to a reset force (102) of a first spring device (100) is suitable to be applied to the first clutch

(18) via a first force transmission element (76) and an actuating force (82) counter to a reset force (116) of a second spring device (114) is suitable to be applied to second clutch (20) via a second force transmission element (80), characterized in that the first spring device (100) extends through at least one recess (104) in the second force transmission element (80) and that the first spring device (100) is arranged further inward of the first and/or the second clutch (18; 20) in a first radial direction (10) and/or is arranged nested with the first and/or second clutch (18; 20) in the first radial direction (10) and a second radial direction (8).

2. The double clutch device (2) according to claim 1, characterized in that the second spring device (114) is arranged further inward of the first and/or second clutch (18; 20) in the first radial direction (10) and/or is arranged nested with the first and/or second clutch (18; 20) in the first radial direction (10) and a second radial direction (8).

3. The double clutch device (2) according to claim 1, characterized in that the first spring device (100) has at least one first spring element (108) which extends through the recess (104).

4. The double clutch device (2) according to claim 1, characterized in that the at least one recess (104) is designed as a window in the second force transmission element (80) and/or multiple recesses (104) are provided in second force transmission element (80) distributed in circumferential directions (12, 14).

5. The double clutch device (2) according to claim 2, characterized in that the first spring device (100) is arranged completely inward of the first and/or the second clutch (18; 20) in the first radial direction (10) and/or is arranged nested with the first and/or second clutch (18; 20) in the first and the second radial directions (8, 10), and/or the second spring device (114) is arranged completely inward of the first and/or second clutch (18; 20) in the first radial direction (10) and/or is arranged nested with the first and/or second clutch (18; 20) in the first and second radial directions (8, 10).

6. The double clutch device (2) according to claim 3, characterized in that multiple recesses (104) are provided through which in each case the at least one first spring element (108) extends, and/or the second spring device (114) has at least one second spring element (118).

7. The double clutch device (2) according to claim 6, characterized in that first spring axes (112) of the first spring elements (108) of the first spring device (100) are arranged on a common first circumferential circle (144) and/or second spring axes (122) of the second spring elements (118) of the second spring device (114) are arranged on a common second circumferential circle (146).

8. The double clutch device (2) according to claim 6, characterized in that the second spring device (114) has multiple second spring elements (118).

9. The double clutch device (2) according to claim 6, characterized in that the at least one first spring element (108) is a first helical spring (110) and/or the at least one second spring element (118) is a second helical spring (120).

10. The double clutch device (2) according to claim 7, characterized in that the first and the second circumferential circles (144, 146) have the same diameter (di=d2).

11. The double clutch device (2) according to claim 7, characterized in that the first spring axes (112) of the first spring elements (108) of the first spring device (100) are arranged on a common first circumferential circle (144) and the second spring axes (122) of the spring elements (118) of the second spring device (114) are arranged on a common second circumferential circle (146), wherein the first and second circumferential circles (144, 146) have diameters (di, d2) that deviate from one another, and the first spring axes (112) of the first spring elements (108) of the first spring device (100) and the second spring axes (122) of the second spring elements (118) of the second spring device (114) are offset to one another.

12. The double clutch device (2) according to claim 10, characterized in that the first spring elements (108) of the first spring device (100) extend through the second spring elements (118) of the second spring device (114), are coaxial to the same, or the first spring elements (108) of the first spring device (100) are arranged offset to the second spring elements (118) of the second spring device (114) in circumferential directions (12, 14).

13. The double clutch device according to claim 11, characterized in that the first spring axes (112) of the first spring elements (108) of the first spring device (100) and the second spring axes (122) of the second spring elements (118) of the second spring device (114) are offset to one another in circumferential directions (12, 14).

14. The double clutch device (2) according to claim 13, characterized in that the circumferential circles (144, 146) and the first and second spring elements (108, 118) are dimensioned in such a way that the first and second spring elements (108, 118) of the first and second spring devices (100, 114) are arranged overlapping one another when viewed in the circumferential directions (12, 14).

15. A double clutch device (2) with a first clutch (18) for selective torque transmission between a clutch input side (26) and a first clutch output side (28), and a second clutch (20) for selective torque transmission between the clutch input side (26) and a second clutch output side (30), wherein an actuating force (78) counter to a reset force (102) of a first spring device (100) is suitable to be applied to the first clutch (18) via a first force transmission element (76) and an actuating force (82) counter to a reset force (116) of a second spring device (114) is suitable to be applied to second clutch (20) via a second force transmission element (80), characterized in that the first spring device (100) extends through at least one recess (104) in the second force transmission element (80) characterized in that the first spring device (100) is supported or supportable on one side on the first force transmission element (76) and on the other side on a clutch component (106), or wherein the second spring device (114) is supported or supportable on one side on the second force transmission element (80) and on the other side on the same clutch component (106).

16. The double clutch device (2) according to claim 15, characterized in that the first and second spring devices (100, 114) are supported or supportable on the clutch component (106) via a common support part (124).

17. The double clutch device (2) according to claim 16, characterized in that the support part (124) has first retaining sections (128), on which the spring elements (108) of the first spring device (100) are retained or fixed, and has second retaining sections (130), on which the spring elements (118) of the second spring device (114) are retained or fixed.

18. The double clutch device (2) according to claim 16, characterized in that the support part (124) is designed as annular shaped or annular disk shaped and as sheet metal or shaped sheet metal parts.

19. The double clutch device (2) according to claim 17, characterized in that the first retaining sections (128) are designed as projecting tubular extensions which extend into the first spring elements (108), and the second retaining sections (130) are designed as projecting tubular extensions which extend into the second spring elements (118) of the second spring device (114).

20. The double clutch device (2) according to claim 18, wherein the retaining sections (128, 130) are designed integrally with the sheet metal or shaped sheet metal part.

21. A double clutch device (2) with a first clutch (18) for selective torque transmission between a clutch input side (26) and a first clutch output side (28), and a second clutch (20) for selective torque transmission between the clutch input side (26) and a second clutch output side (30), wherein an actuating force (78) counter to a reset force (102) of a first spring device (100) is suitable to be applied to the first clutch (18) via a first force transmission element (76) and an actuating force (82) counter to a reset force (116) of a second spring device (114) is suitable to be applied to second clutch (20) via a second force transmission element (80), characterized in that the first spring device (100) extends through at least one recess (104) in the second force transmission element (80) characterized in that the double clutch device (2) is a concentric double clutch device (2), wherein the first clutch (18) is designed as an outer clutch and the second clutch (20) is designed as an inner clutch, and/or the first clutch (18) and the second clutch (20) are designed as disk clutches.

22. The double clutch device (2) according to claim 21, characterized in that the first force transmission element (76) has actuating fingers (88) which extend through windows (72) in a disk carrier (36) to a disk set (22) of the first clutch (18), and/or the second force transmission element (80) has actuating fingers (94) which extend through windows (74) in a disk carrier (50) to a disk set (24) of the second clutch (20).

\* \* \* \* \*